US007454199B2

(12) United States Patent
Minear et al.

(10) Patent No.: US 7,454,199 B2
(45) Date of Patent: **\*Nov. 18, 2008**

(54) SYSTEM AND METHOD FOR TEMPORARY APPLICATION COMPONENT DELETION AND RELOAD ON A WIRELESS DEVICE

(75) Inventors: Brian Minear, San Diego, CA (US); Richard Wayne Gardner, III, Solana Beach, CA (US); Stephen A. Sprigg, Poway, CA (US); Phil Tien Nguyen, San Diego, CA (US); Mitchell B. Oliver, San Diego, CA (US); Eric J. Lekven, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/221,091

(22) Filed: Sep. 6, 2005

(65) Prior Publication Data
US 2006/0005183 A1 Jan. 5, 2006

Related U.S. Application Data

(63) Continuation of application No. 09/929,250, filed on Aug. 13, 2001, now Pat. No. 6,941,135.

(51) Int. Cl.
*H04Q 7/20* (2006.01)
(52) U.S. Cl. .............. 455/418; 455/414.1; 455/419; 455/420
(58) Field of Classification Search ......... 455/418–420, 455/414.1, 550.1, 557, 556.1, 90.1; 709/211–220, 709/203, 232; 711/159, 154, 112; 717/168, 717/171, 173, 178, 101; 707/200; 713/1, 713/2, 100
See application file for complete search history.

(56) References Cited

U.S. PATENT DOCUMENTS 5,163,082 A 11/1992 Karnowski (Continued)

FOREIGN PATENT DOCUMENTS

| CA | 2267549 | * | 9/2000 |
|----|---------|---|--------|
| WO | 9922325 | | 6/1999 |
| WO | WO99/57875 A2 | * | 11/1999 |

OTHER PUBLICATIONS

International Search Report PCT/US2002/025466. INternatioanl Search Authority-US, Dec. 23, 2002.

*Primary Examiner*—Jean A Gelin
(74) *Attorney, Agent, or Firm*—James T. Hagler; Robert J. O'Connell; Thomas Rouse

(57) ABSTRACT

A system and method for managing the deleting and reloading of software application components on a wireless device, such as a cellular telephone, personal digital assistant, pager, or other computer platform. The wireless device has one or more resident executable software applications wherein each application has one or more application components and application-associated data, such as software licenses and user-specific data. The wireless device selectively deletes one or more application components of the resident software applications without loss of the application-associated data to clear resources on the wireless device, and selectively prompts an application download server across a wireless network to transmit deleted application components needed to be reinstalled on the wireless device to execute the application.

27 Claims, 4 Drawing Sheets

U.S. PATENT DOCUMENTS

| | | |
|---|---|---|
| 5,302,947 A | 4/1994 | Fuller et al. |
| 5,418,524 A | 5/1995 | Fennell |
| 5,471,518 A | 11/1995 | Barber et al. |
| 5,473,772 A | 12/1995 | Halliwell et al. |
| 5,708,698 A | 1/1998 | Akahane |
| 5,742,829 A | 4/1998 | Davis et al. |
| 5,764,992 A | 6/1998 | Kullick et al. |
| 5,778,234 A * | 7/1998 | Hecht et al. ............... 717/173 |
| 5,835,911 A | 11/1998 | Nakagawa et al. |
| 5,848,064 A | 12/1998 | Cowan |
| 6,031,830 A | 2/2000 | Cowan |
| 6,226,739 B1 * | 5/2001 | Eagle ............................ 713/1 |
| 6,415,160 B1 | 7/2002 | Wichmann |
| 6,427,227 B1 * | 7/2002 | Chamberlain ............... 717/124 |
| 6,496,979 B1 * | 12/2002 | Chen et al. .................. 717/178 |
| 6,542,911 B2 * | 4/2003 | Chakraborty et al. ....... 707/206 |
| 6,587,684 B1 | 7/2003 | Hsu et al. |
| 6,629,227 B1 * | 9/2003 | Jerding et al. ............... 711/170 |
| 6,678,463 B1 * | 1/2004 | Pierre et al. .................. 386/83 |
| 6,832,230 B1 * | 12/2004 | Zilliacus et al. ............. 707/203 |
| 6,941,135 B2 * | 9/2005 | Minear et al. ............... 455/419 |
| 6,986,148 B2 | 1/2006 | Johnson, Jr. et al. |
| 6,993,328 B1 * | 1/2006 | Oommen .................... 455/419 |
| 7,062,543 B2 | 6/2006 | Kishimoto |
| 7,086,051 B2 * | 8/2006 | Gautney ..................... 717/176 |
| 7,143,405 B2 * | 11/2006 | Liu et al. ..................... 717/173 |
| 2002/0072355 A1 | 6/2002 | Jeong et al. |
| 2002/0123336 A1 | 9/2002 | Kamada |
| 2003/0041125 A1 | 2/2003 | Salomon |
| 2004/0158829 A1 * | 8/2004 | Beresin et al. ............... 717/178 |
| 2004/0214560 A1 * | 10/2004 | Date et al. .................. 455/418 |

* cited by examiner

SYSTEM AND METHOD FOR TEMPORARY APPLICATION COMPONENT DELETION AND RELOAD ON A WIRELESS DEVICE

CROSS-REFERENCE TO RELATED APPLICATIONS

This application is a continuation of U.S. application Ser. No. 09/929,250, filed Aug. 13, 2001, now U.S. Pat. No. 6,941,135 (allowed and issue fee paid), the contents of which are hereby incorporated by reference.

BACKGROUND OF THE INVENTION

I. Field of the Invention

The present invention generally relates to data networks and computer communications across the data networks. More particularly, the invention relates to the installation and deletion of software applications and their components on wireless devices in selective communication with one or more application download servers across a wireless data network.

II. Description of the Related Art

Wireless devices, such as cellular telephones, communicate packets including voice and data over a wireless network. Cellular telephones themselves are being manufactured with increased computing capabilities and are becoming tantamount to personal computers and hand-held personal digital assistants ("PDAs"). These "smart" cellular telephones have installed application programming interfaces ("APIs") onto their local computer platform that allow software developers to create software applications (commonly referred to as "programs") that are fully executable on the cellular telephone. The API sits between the wireless device system software and the software application making the cellular telephone computing functionality available to the application without requiring the software developer to have the specific cellular telephone system source code.

The software applications can come pre-loaded at the time the wireless telephone is manufactured, or the user may later request that additional programs be downloaded over cellular telecommunication carrier networks, where the downloaded applications are executable on the wireless telephone. As a result, users of wireless telephones can customize their wireless telephones through the selective downloading of applications, such as games, printed media, stock updates, news, or any other type of information or application that is available for download through the wireless network. In order to manage the cellular telephone resources, the user of the wireless telephone purposefully deletes applications and data from the wireless telephone platform to clear storage space so that new applications can be loaded onto the cleared storage.

In contrast to the larger computer platforms of personal computers and PDAs, wireless devices have limited resources, such as storage and processing, to devote to non-essential applications. Typically, the telecommunication applications have priority of usage of the system resources, with other applications allocated resources as available. The wireless device thus only has a limited capacity for holding all files for applications, and the managing of resources is left up to the discretion of user of the telephone to delete applications to make room for new applications desired downloaded to the wireless device. The wireless device will not otherwise download an application that it does not have the resources to hold and execute.

In seeking to free resources on the wireless device, the user normally cannot remove certain components of a resident application without disabling the entire resident application. If the user sought to delete specific components, such action would controvert the intended freeing of resources as the disabled resident application cannot be restored without full reinstallation of the application. The useless undeleted application components still needlessly take up storage space even though the main application is unexecutable. This all-or-nothing deletion requirement for the resident software applications on the wireless device greatly limits the number of applications that can be resident on the wireless device and available to the user.

Accordingly it would be advantageous to provide a wireless device that can remove certain components of applications while maintaining important data for the application, such as licenses and user-specific data, to maximize the utilization of computer resources on the wireless device. Upon the wireless device requiring the deleted software components to again execute the application, the wireless device can obtain the software components through the wireless network. It is thus to the provision of such a system and method that can control the deletion and reloading of select software application components at the wireless device that the present invention is primarily directed.

SUMMARY OF THE INVENTION

The present invention is a system and method for managing the loading and deletion of software application components on a wireless device, such as a cellular telephone, personal digital assistant, pager, or other computer platform. The wireless device has one or more resident executable software applications wherein each application includes one or more application components and application-associated data, such as software licenses and user-specific data, and the wireless device is in selective communication with a wireless network. There is at least one application download server on the wireless network that selectively communicates with wireless devices and downloads software applications and application components to the wireless devices.

To manage system resources, and especially storage space, the wireless device selectively deletes one or more application components of the one or more resident software applications without loss of the application-associated data, and then selectively prompts the application download server across the wireless network for transmission of one or more application components when the application is again desired to be executed on the wireless device. Once the one or more application components are received from the application download server, the wireless device installs the one or more application components for resident applications with components previously deleted such that the resident applications are again executable on the wireless device.

The application-associated data is data that is typically not recoverable should it be deleted. Examples of the application-associated date can be data required to execute the software application, such as a license, or could be user-specific data such as personal identification data, high scores for games, an address book, or the like, with or without the license. The application-associated data can also include application components necessary to execute the application on the wireless device such as a specific driver or application-critical module.

The method for managing the loading and removal of components of one or more software applications resident on a wireless device accordingly includes the steps of selectively deleting at the wireless device one or more application components of the one or more resident software applications without loss of the application-associated data, selectively establishing a communication link from the wireless device to an application download server wherein the wireless device prompts the application download server for transmission of one or more deleted application components, and installs the transmitted one or more application components such that the one or more resident applications including the installed application components are executable on the wireless device.

The step of establishing a communication link is preferably establishing a communication link through a cellular telecommunication network, especially if the wireless device is a cellular telephone or pager. The establishing of a communication link typically occurs upon the wireless device intending to execute a resident software application for which one or more associated components have been deleted, and wireless device can prompt the user to make a communication link to the application download server to retrieve a copy of the deleted component, if necessary.

The step of selectively deleting at the wireless device one or more application components of the one or more resident software applications preferably occurs at the direction of the user of the wireless device when the user desires to clear resources to download a new software application that will require the resources. However, the deletion can occur as determined by the wireless device managing its resources in accord with the actions of the user seeking to download applications which requires the freeing of system resources.

The present invention also includes a wireless device itself that can function in the inventive system, and a program in a computer readable medium that directs a wireless device having a computer platform to perform the steps of the inventive method.

Accordingly, the primary object of the present invention is to provide a system and method that allow a wireless device to delete certain components of its resident software applications while maintaining important data for the applications, such as licenses and user-specific data, to maximize the utilization of computer resources, such as storage. The wireless device can still execute the software application for which components have been deleted by retrieving copies of the deleted software components through the wireless network from the application download server. The invention thus provides an advantage to the user of the wireless device through efficient usage of the wireless device system resources such that the user can have ready access to a larger amount of executable software applications than can be completely stored on the wireless device. While the component deletion and reloading processes can be at the direction of the user, the processes can also be fully automated on the wireless device such that the processes are transparent to the user.

Other objects, advantages, and features of the present invention will become apparent after review of the hereinafter set forth Brief Description of the Drawings, Detailed Description of the Invention, and the Claims.

DETAILED DESCRIPTION OF THE INVENTION

Figure 1:
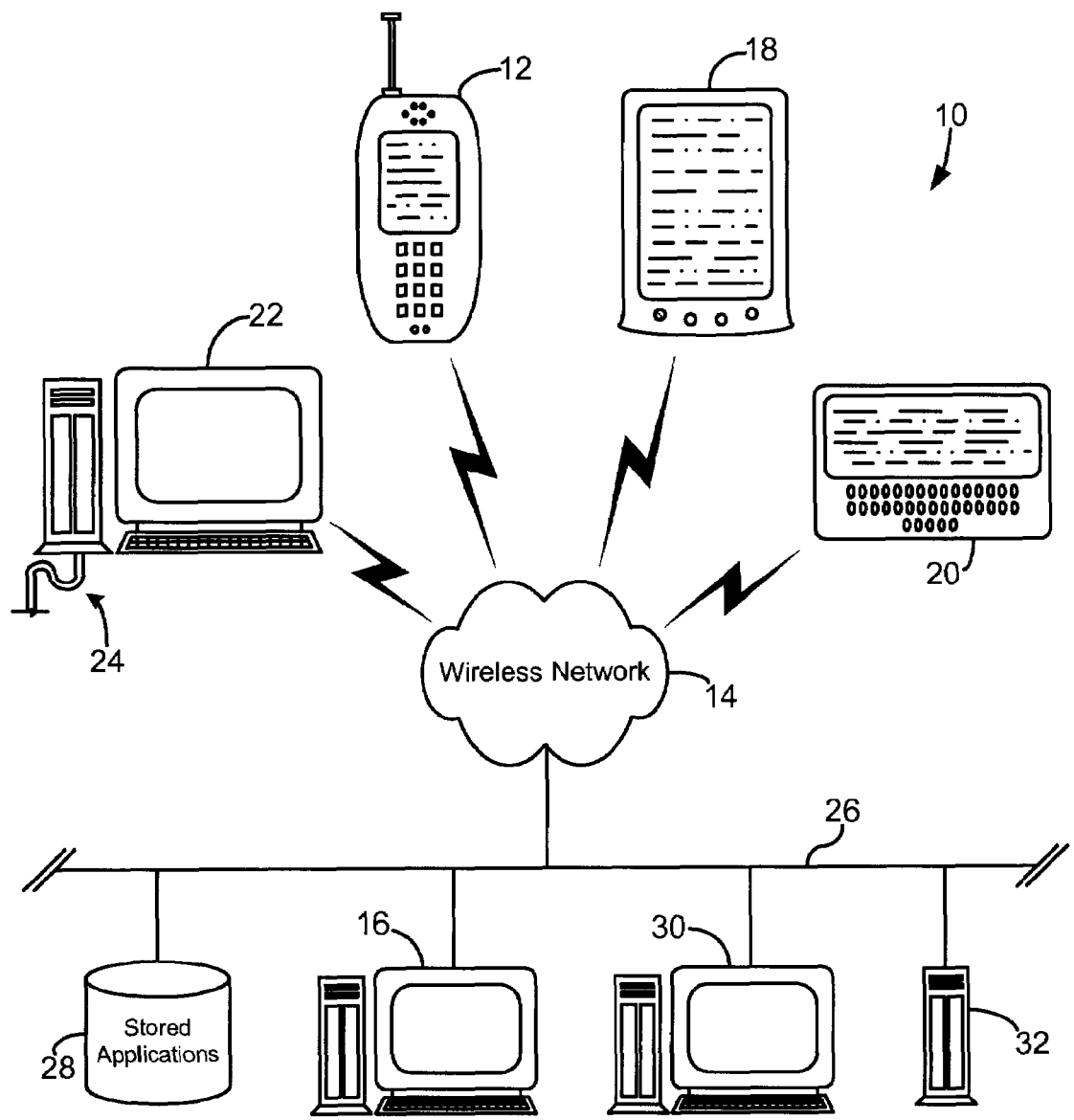
FIG. 1 is a representative diagram of the present invention system of managing the temporary deletion and reloading of software application components on wireless devices in selective communication with one or more application download servers over a wireless network.

With reference to FIG. 1, there is shown the present inventive system 10 for the deletion and reloading of software application components on a wireless device, such as cellular telephone 12, in communication across a wireless network 14 with at least one application download server 16 that selectively transmits software applications and components to wireless devices across a wireless communication portal or other data access to the wireless network 14. As shown here, the wireless device can be a cellular telephone 12, a personal digital assistant 18, a pager 20, which is shown here as a two-way text pager, or even a separate computer platform 22 that has a wireless communication portal, and may otherwise have a wired connection 24 to a network or the Internet. The inventive system can thus be performed on any form of remote module including a wireless communication portal, including without limitation, wireless modems, PCMCIA cards, access terminals, personal computers, access terminals, telephones without a display or keypad, or any combination or sub-combination thereof.

The application download server 16 is shown here on a network 26 with other computer elements in communication with the wireless network 14. There is a second server 30 and a stand-alone server 32, and each server can provide separate services and processes to the wireless devices 12,18,20,22 across the wireless network 14. There is preferably also at least one stored application database 28 that holds the applications that are downloadable by the wireless devices 12,18, 20,22.

Figure 2:
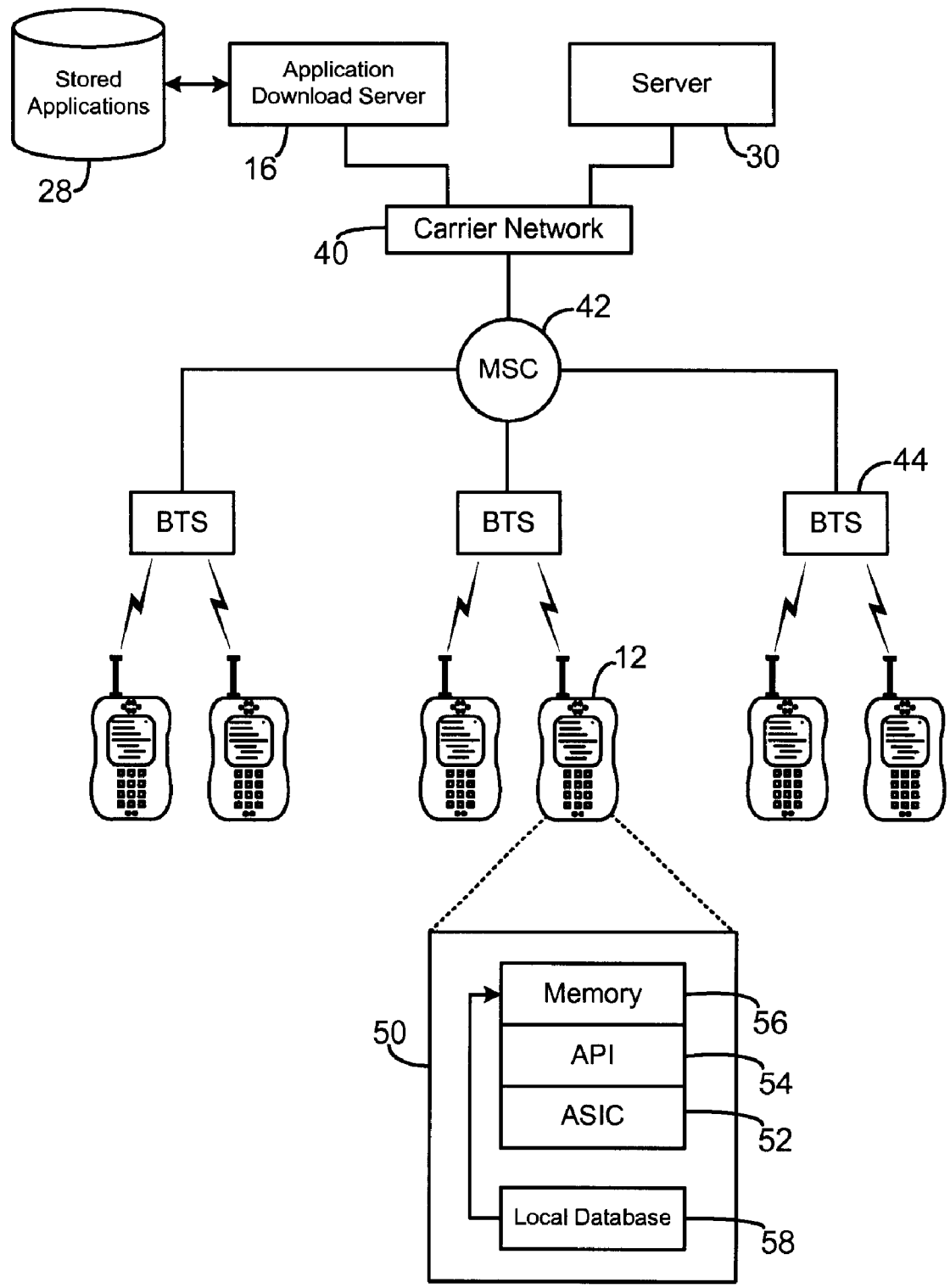
FIG. 2 is a block diagram of the hardware components of an exemplary wireless network providing communication between different wireless devices and an application download server and database.

In FIG. 2, a block diagram is shown that more fully illustrates the components of the wireless network 14 and interrelation of the elements of the present invention. The wireless network 14 is merely exemplary and can include any system whereby remote modules, such as wireless devices 12,18,20, 22 communicate over-the-air between and among each other and/or between and among components of a wireless network 14, including, without limitation, wireless network carriers and/or servers. The application download server 16 and the stored application database 28, along any other servers such as server 30 which are needed to provide cellular telecommunication services, communicate with a carrier network 40, through a data link, such as the Internet, a secure LAN, WAN, or other network. The carrier network 40 controls messages (sent as data packets) sent to a messaging service controller ("MSC") 42. The carrier network 40 communicates with the MSC 42 by a network, the Internet and/or POTS ("plain ordinary telephone system"). Typically, the network or Internet connection between the carrier network 40 and the MSC 42 transfers data, and the POTS transfers voice information. The MSC 42 is connected to multiple base stations ("BTS") 44. In a similar manner to the carrier network, the MSC 42 is typically connected to the BTS 44 by both the network and/or Internet for data transfer and POTS for voice information. The BTS 44 ultimately broadcasts messages wirelessly to the wireless devices, such as cellular telephone 12, by short messaging service ("SMS"), or other over-the-air methods known in the art.

The wireless device, such as cellular telephone 12, has a computer platform 50 that can receive and execute software applications transmitted from the application download server 16. The computer platform 50 includes an application-specific integrated circuit ("ASIC" 52), or other processor, microprocessor, logic circuit, or other data processing device. The ASIC 52 is installed at the time of manufacture of the wireless device and is not normally upgradeable. The ASIC 52 or other processor executes the application programming interface ("API") layer that interfaces with any resident programs in the memory 56 of the wireless device. The memory can be comprised of read-only or random-access memory (RAM and ROM), EPROM, flash cards, or any memory common to computer platforms. The computer platform 50 also includes a local database 58 that can hold applications not actively used in memory 56. The local database 58 is typically a flash memory cell, but can be any secondary storage device as known in the art, such as magnetic media, EPROM, optical media, tape, or soft or hard disk.

The wireless device, such as cellular telephone 12, accordingly downloads one or more software applications, such as games, news, stock monitors, and the like, and holds the application on the local database 58 when not in use, and uploads stored resident applications on the local database 58 to memory 56 for execution on the API 54 when so desired by the user. However, there are significant cost and size constraints on the wireless device that limit the installed storage capability available in the local database 58 and memory 56, so a limited amount of resident software applications can be held on the wireless device. The present inventive system and method manages this limitation of storage capacity through the selective deletion and reloading of individual software application components, as is further described herein.

Figure 3:
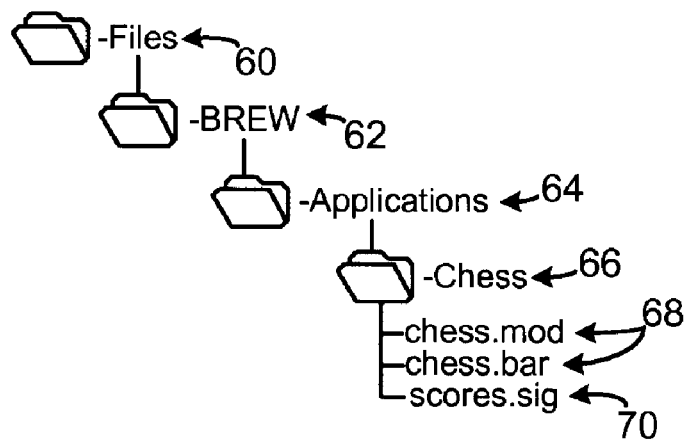
FIG. 3 is a file table resident on the wireless device platform specifically illustrating an application with its constituent components.

With reference to FIG. 3, there is shown an illustrative file structure, or data management structure, held in the API 54. The top-level domain is "Files" 60 that contains all of the discrete software files on the computer platform 50. The file structure of FIG. 3 is merely illustrative and may not appear in this form on the computer platform 50, and may even be present purely in machine code on the wireless device 12,18, 20,22 with no discernable file structure. In the Files 60 is the API, which here is shown as binary runtime environment for wireless ("BREW") 62, which is the API used by QUAL-COMM® to interact with software applications on the wireless device computer platform 50. The BREW 62 files include application files 64, and one file is game of chess 66 that has been downloaded from the application download server 16 and is now resident on the local database 58 of the computer platform 50 of the wireless device. For purposes of illustration, the chess 66 application is a resident software application of the wireless device.

The chess 66 application includes several software components 68, such as the files chess.mod and chess.bar. The application components 68 are necessary modules to execute the chess application on the computer platform 50. Chess 66 also includes specific application-associated data, shown here as a scores.sig 70, which are the stored scores for the user playing games of chess on the computer platform 50. There also can be a license included as a hidden file in the chess 66 application. Thus, the application components 68 that allow execution of the game of chess are easily duplicated with a copy transmitted from the application download server 16, while the associated-application data, such as the scores 70 and the license will be lost if their files or modules are deleted.

The present invention therefore utilizes the ability to obtain another copy of the non-essential application components from the application download server 16 while maintaining the non-retrievable application-associated data, such as a license, or user specific data, such as personal information and addresses, or even purely entertainment-related data such as the previous scores 70 for chess games.

When the user desires to download another software application to the computer platform 50 and there are insufficient resources, especially in terms of storage on the local database 58, the BREW API 62, or other space-managing components, can trigger a prompt to the user to ask if the application components for chess can be removed so that the requested downloaded application can be placed on the computer platform 50. Otherwise, the BREW API 62 can determine which components to delete and automatic manage the system resources. While the chess.mod and chess.bar files are deleted from the chess 66 file, the chess game will not be executable on the computer platform 50. Through the separation of essential and non-essential files on the computer platform 50, the wireless device can selectively delete one or more of the application components 68 of the one or more resident software applications without loss of the application-associated data, such as the scores file 70.

When the application which has had one or more application components deleted, such as the chess game 66 with the chess.mod and the chess.bar application components 68 deleted and the user desires to again use that application, the wireless device will selectively prompts the application download server 16 across the wireless network 14 for transmission of one or more application components 68. Once the wireless device receives the application components 68, the wireless device installs the transmitted one or more application components 68 back onto the computer platform 50 such that the resident application, or here chess 66, is again executable. It should be noted that all of the application components 68 do not have to be removed, and can be deleted based upon size of the application or other criteria. Further, the files containing application-associated data, such as scores.sig 70, can also contain application components required to execute the application and are not necessarily pure data-containers.

Figure 4:
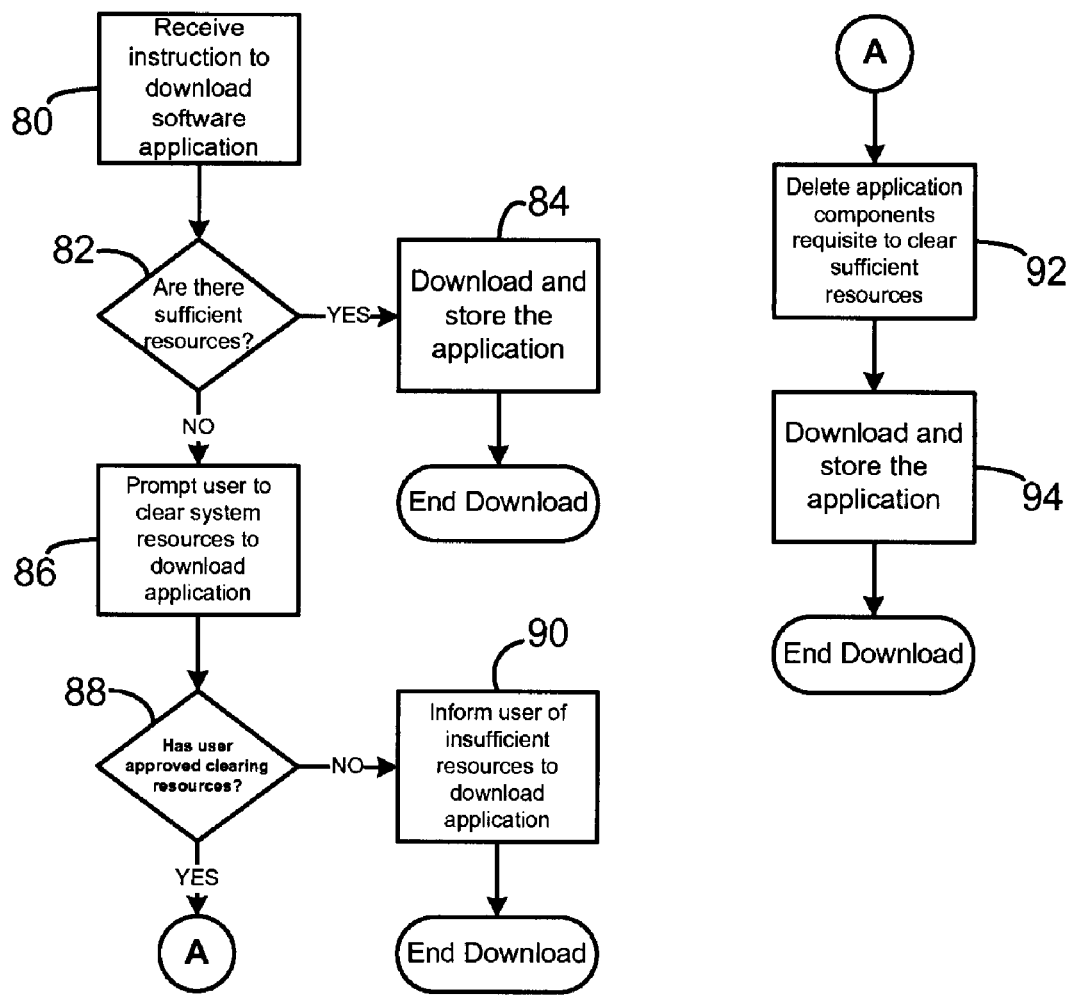
FIG. 4 is a flowchart illustrating the selective deletion of application components on the wireless device.
Figure 5:
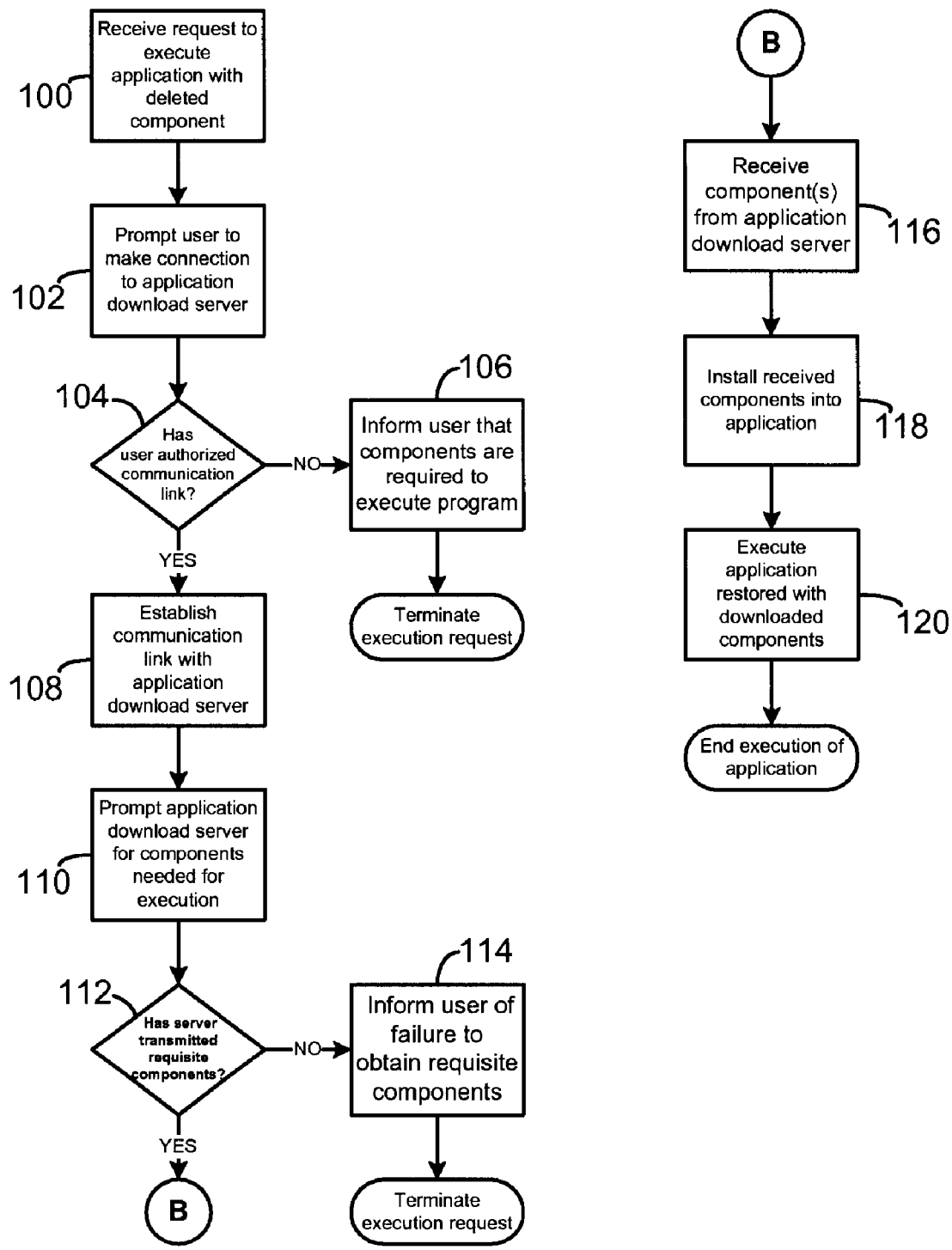
FIG. 5 is a flowchart illustrating the retrieval of the wireless device of application components from the application download server to restore an application on the wireless device such that the application is again executable.

FIGS. 4 and 5 are flowcharts illustrating the inventive method for managing the loading and removal of application components 68 of one or more software applications resident on the computer platform 50 of a wireless device 12,18,20,22. As shown in FIG. 4, the computer platform 50 receives the instruction to download a software application, shown at step 80, and then a decision is made on the ASIC 52 or other processor of the wireless device as to whether there are sufficient resources available to download the application, as shown at decision 82. If there are sufficient resources available, then the application is downloaded and stored, as shown at step 84, and the download process is terminated. If there are insufficient resources at decision 82, then the user is prompted to clear system resources in order to download the application, as shown at step 86, which entail the deleting of certain application components. A decision is then made as to whether the user approves of clearing resources, as shown at decision 88, and if not, the user is informed of the insufficient resources available for the download, as shown at step 90, and the download process is terminated. If the user approves of clearing resources at decision 88, then one or more application components, such as components 68, are selectively deleted to clear the requisite resources, and such deletion occurs without significant loss of the application-associated data, such as the scores.sig file 70 or any license to use the application. Then the application is downloaded and stored on the computer platform 50, as shown at step 94, and the down load process is terminated.

The process to reinstall the deleted components is shown in FIG. 5 when a request to execute the application with one or more deleted components 68 is received, as shown at step 100. An example of this would be the user seeking to play the chess game once again. The user is then preferably prompted to make a communication link to the application download server 16, as shown by step 102. However, the wireless device at receipt of the execution request can alternately automatically establish the communication link. If a request to execute the application is requested of the user, then a decision is made as to whether the user has authorized the link, as shown at decision 104. If the user declines establishing the link, the user is informed that the needed application components must be downloaded in order to execute the request application, as shown at step 106, and then the execution request is terminated. If the user authorizes the communication link at decision 104, then a communication link is establish with the application download server 16, as shown at step 108.

Once the communication link is established with the application download server 16, the application download server 16 is prompted by the wireless device to transmit one or more application components that are needed by the wireless device to execute the requested application, as shown at step 110. It is then determined if the server transmitted requisite application components, as shown at decision 112, and if not, the user is informed of the failure to obtain the requisite components, as shown at step 114, and the execution request is terminated. Otherwise, if the server has transmitted the requisite components at decision 112, the wireless device receives the components form the application download server, as shown at step 116, and installs the received components into the application such that the application is executable, as shown at step 118. The application is then executed on the wireless device until terminated, as shown at step 120.

If the reloading of the deleted application components, such as application components 68, were automatic, the process of FIG. 5 would go right from the receipt of the request to execute the application at step 100 to prompting the application download server 16 at step 110. The wireless device would only inform the user if the application failed to download the components, as shown at step 114.

The step of establishing a communication link is typically establishing a communication link through a digital or analog cellular telecommunication network as shown in FIG. 2, but other wireless networks such as a wireless LAN, or a microwave or infrared network can alternately be used. Further, establishing a communication link can occur automatically upon the wireless device 12,18,20,22 intending to execute a resident software application for which one or more associated components have been deleted, i.e. the wireless device bridges a communication through the wireless network 14 to the application download server 16. Otherwise, the step of establishing a communication link can occur upon the specific prompt of user of the wireless device 12,18,20,22 to bridge a communication link the application download server 16 to transmit over the wireless network 14 one or more application components for a resident software application for which one or more associated components have been deleted. If the user of the wireless device will be billed for the communication link, such as a cellular phone call, in order to have the new application components transmitted to the wireless device, then the user should be prompted prior to deletion of the component(s) to authorize the communication link that will be necessarily to reload the components. The user can again be prompted when the communication link is needed to retrieve the components of the application to render the application executable. However, if the wireless device is fully automated and the communication link does not necessitate a charge to the user, then no prompt needs to be made to the user, and the reloading of the component(s) is transparent, unless a problem is encountered and an error message generated, such as at step 114.

In view of the inventive method, the present invention includes a program resident in a computer readable medium, where the program directs a wireless device having a computer platform to perform the inventive steps of the method. The computer readable medium can be the memory 56 of the computer platform 50 of the cellular telephone 12, or other wireless device, or can be in a local database, such as local database 58 of the cellular telephone 12. Further, the computer readable medium can be in a secondary storage media that is loadable onto a wireless device computer platform, such as a magnetic disk or tape, optical disk, hard disk, flash memory, or other storage media as is known in the art. In the context of FIGS. 4 and 5, the present invention methods may be implemented, for example, by operating portion(s) of the wireless network 14 to execute a sequence of machine-readable instructions. These instructions may reside in various types of signal-bearing media. This signal-bearing media may comprise, for example, RAM (not shown) accessible by, or residing within, the components of the wireless network 14. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape), paper "punch" cards, or other suitable data storage media including transmission media such as digital and analog.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. A method for managing a memory in a device for storing applications, each application comprising at least one application component and application-associated data, the method comprising:

receiving a first transaction;

determining if an available amount of said memory is sufficient for performing said first transaction;

if said available amount of said memory is insufficient for performing said first transaction, continuing to increase said available amount by deleting one or more application components associated with one or more applications not currently executing until said available amount of said memory is sufficient for performing said first transaction;

receiving a second transaction for executing a selected application from said applications stored in said memory;

determining whether all application components associated with said selected application are stored in said memory; and if all application components of said selected application are not stored in said memory, restoring only each previously deleted application component of said selected application;

wherein said deleting maintains application-associated data in said memory.

2. The method of claim 1, wherein said first transaction is an application download.

3. The method of claim 2, wherein said device is a wireless device and said application download is performed over a wireless network.

4. The method of claim 3, wherein said wireless device is a wireless telephone.

5. The method of claim 2, further comprising:
communicating with a server over a network to perform said application download.

6. The method of claim 1, wherein said restoring comprises:
downloading only each previously deleted application component of said selected application from a network server.

7. The method of claim 1, wherein said deleting further comprises selectively deleting said one or more application components based on a determination by said device.

8. The method of claim 1, wherein said one or more application components comprise a component operable to allow execution of the respective one of said one or more applications.

9. The method of claim 1, wherein said deleting further comprises selectively deleting said one or more application components based on a received user input.

10. The method of claim 1, wherein said restoring further comprises:
automatically establishing a communication link with at least one application server;
requesting only each previously deleted application component of said selected application from said at least one application server; and
receiving only each requested previously deleted application component.

11. The method of claim 1, wherein said restoring further comprises:
establishing a communication link with at least one application server based on a user authorization;
requesting only each previously deleted application component of said selected application from said at least one application server; and
receiving only each requested previously deleted application component.

12. A computer-readable medium comprising instructions, which, when executed by a computer, causes the computer to perform operations, the instructions comprising:
at least one instruction for receiving a first transaction;
at least one instruction for determining if an available amount of said memory is sufficient for performing said first transaction;
if said available amount of said memory is insufficient for performing said first transaction, at least one instruction for continuing to increase said available amount by deleting one or more application components associated with one or more applications not currently executing until said available amount of said memory is sufficient;
at least one instruction for receiving a second transaction for executing a selected application from said applications stored in said memory;
at least one instruction for determining whether all application components associated with said selected application are stored in said memory; and
if all application components of said selected application are not stored in said memory, at least one instruction for restoring only each previously deleted application component of said selected application;
wherein said deleting maintains application-associated data in said memory.

13. A method for managing a server, comprising:
storing, on said server, a plurality of applications, each application comprising at least one application component and application-associated data;
first sending, to a client device, an entirety of one of said applications; and
second sending, to said client device, a portion of one of said applications, said portion comprising only one or more application components of said application previously deleted by said client device and not including said application-associated data of said application, said one or more application components having been deleted until an available amount of memory of said client device increased sufficiently for performing a transaction, said one or more application components having been deleted when said application was not being executed.

14. The method of claim 13, wherein said client device is a wireless device and said first sending and said second sending are performed over a wireless network.

15. A computer-readable medium comprising instructions, which, when executed by a computer, cause the computer to perform operations, the instructions comprising:
at least one instruction for storing, on said machine, a plurality of applications, each application comprising at least one application component and application-associated data;
at least one instruction for first sending, to a client device, an entirety of one of said applications; and
at least one instruction for second sending, to said client device, a portion of one of said applications, said portion comprising only one or more application components of said application previously deleted by said client device and not including said application-associated data of said application, said one or more application components having been deleted until an available amount of memory of said client device increased sufficiently for performing a transaction, said one or more application components having been deleted when said application was not being executed.

16. A method for increasing an available amount of storage for storing applications, each application comprising at least one application component and application-associated data, comprising:
deleting, from a non-executing application, one application component while maintaining application-associated data of said application;
determining a minimum threshold for said available amount of storage;
if a current level of said available amount of storage is less than said minimum threshold, continuing to delete additional application components while maintaining application-associated data of said application until said current level is equal to or greater than said threshold,
wherein before executing said application, only said previously deleted application components of said application are restored to storage.

17. A computer-readable medium comprising instructions, which, when executed by a computer, cause the computer to perform operations, the instructions comprising:
- at least one instruction for deleting, from a non-executing, one application component while maintaining application-associated data of said application;
- at least one instruction for determining a minimum threshold for said available amount of storage;
- if a current level of said available amount of storage is less than said minimum threshold, at least one instruction for continuing to delete additional application components while maintaining application-associated data of said application until said current level is equal to or greater than said threshold,
- wherein before executing said application, only said previously deleted application components of said application are restored to storage.

18. A device, comprising:
- a network component for communicating over a network; and
- a computer platform, said computer platform comprising:
- a memory for storing software applications, each software application comprising at least one application component and application-associated data; and
- a processing element for controlling communication via said network component between said device and a server, and for managing contents of said memory;
- wherein said processing element is configured to manage an available amount of said memory by deleting one or more application components of a non-executing application stored in said memory until said available amount of said memory is sufficient for performing a transaction while maintaining application-associated data of said non-executing application in said memory, and
- further wherein said processing element is configured to cause said network component to download only each previously deleted application component of said application before executing said application.

19. The device of claim 18, wherein said network component is a wireless transceiver and said network is a wireless network.

20. The device of claim 19, wherein said device is a wireless telephone.

21. The device of claim 18, wherein said processing element is further configured to selectively determine the at least one application component.

22. The device of claim 18, wherein said processing element is further configured to selectively delete the at least one application component based on a received user input.

23. The device of claim 18, wherein said at least one application component comprises a component operable to allow execution of said non-executing application.

24. The device of claim 18, wherein said processing element is further configured to cause the device to:
- automatically establish a communication link with at least one application server;
- request only each previously deleted application component from said at least one application server; and
- receive only each previously deleted application component from said at least one application server.

25. The device of claim 18, wherein said processing element is further configured to cause the device to:
- establish a communication link with at least one application server based on a user authorization;
- request only each previously deleted application component from said at least one application server; and
- receive only each previously deleted application component from said at least one application server.

26. A device comprising:
- a memory means for storing applications, each application comprising at least one application component and application-associated data;
- means for deleting, from a non-executing application, one application component while maintaining application-associated data of said application;
- means for determining a minimum threshold for said available amount of storage capacity of said memory means;
- if a current level of said available amount of storage capacity of said memory means is less than said minimum threshold, means for continuing to delete additional application components while maintaining application-associated data of said application until said current level is equal to or greater than said threshold,
- wherein before executing said application, only said previously deleted application components of said application are restored to said memory means.

27. A server, comprising:
- means for storing, on said server, a plurality of applications, each application comprising at least one application component and application-associated data; and
- means for sending, to a client device, an entirety of one of said applications, and further for sending a portion of the one of said applications, said portion comprising only one or more application components of said application previously deleted by said client device and not including said application-associated data of said application, said one or more application components having been deleted until an available amount of memory of said client device increased sufficiently for performing a transaction, said one or more application components having been deleted when said application was not being executed.

* * * * *